Oct. 26, 1948.  H. KLEMPERER  2,452,060
IGNITION INDICATING DEVICE FOR WELDING SYSTEMS
Filed Jan. 24, 1944
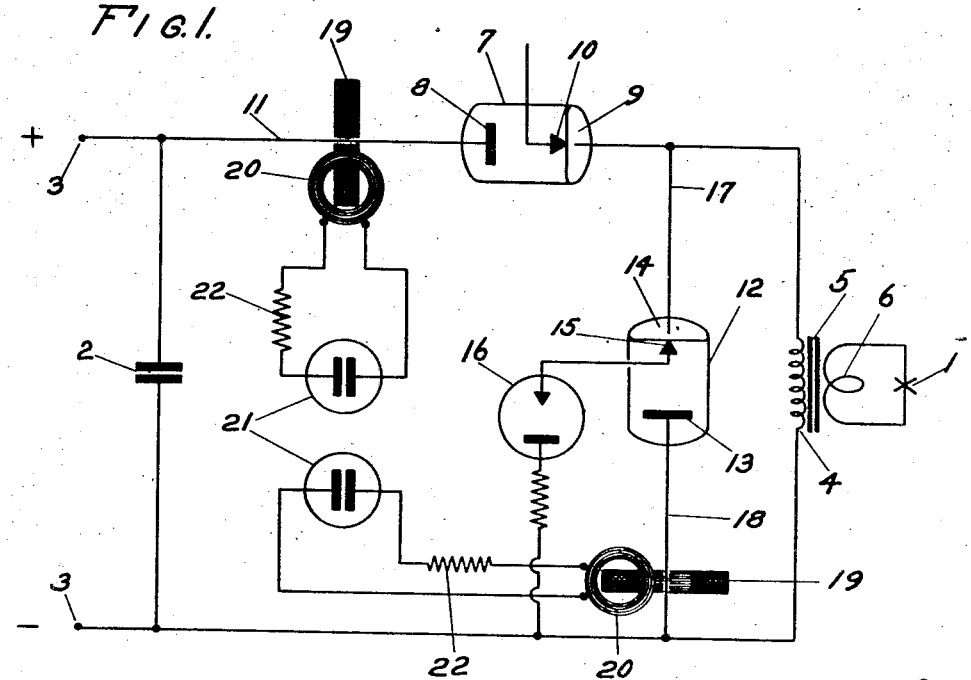
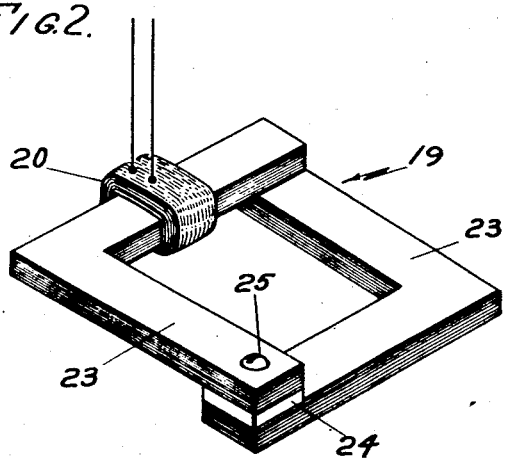
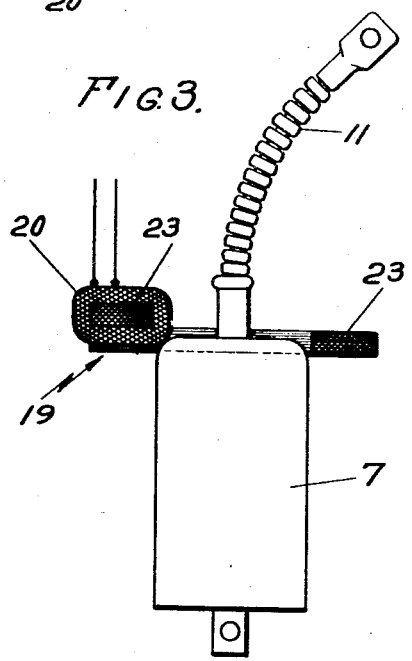
INVENTOR.
HANS KLEMPERER,
By Elmer J. Gorn
ATTY.

Patented Oct. 26, 1948

2,452,060

UNITED STATES PATENT OFFICE 2,452,060

IGNITION INDICATING DEVICE FOR WELDING SYSTEMS

Hans Klemperer, Belmont, Mass., assignor to Raytheon Manufacturing Company, Newton, Mass., a corporation of Delaware Application January 24, 1944, Serial No. 519,584

6 Claims. (Cl. 177—311)

This invention relates to an electrical system, particularly of the resistance welding type, in which current impulses are supplied to the load through a network containing one or more controlled ignition tubes, the ignition of which controls said current impulses.

In a resistance welding system of the above type, it sometimes occurs that one or more of the controlled ignition tubes fail to ignite upon an ignition impulse being supplied thereto, and in other instances one or more of said tubes conduct in the wrong direction. In either case a defective weld may occur and therefore it is desirable that a signal be supplied to the operator for each welding impulse to indicate whether or not the system has operated in the proper manner so as to produce a satisfactory weld.

An object of this invention is to provide an arrangement in which a signal, which is preferably visible, is supplied to the operator each time a controlled ignition tube in such a system is ignited.

Another object is to devise such a system in which the signal is increased in intensity to a readily perceptible degree when the back fire of one or more of said controlled ignition tubes occurs.

The foregoing and other objects of this invention will be best understood from the following description of an exemplification thereof, reference being had to the accompanying drawing wherein:

Fig. 1 is a diagrammatic representation of a circuit incorporating this invention;

Fig. 2 is a perspective view of the magnetic coupling arrangement for deriving a signal in the system as shown in Fig. 1; and Fig. 3 is a side view of an ignition tube carrying a magnetic coupling device, said device being shown in section.

In the system illustrated, a load 1, which is preferably a resistance welding load, is to be supplied with periodic pulses of welding current from a condenser 2. The condenser 2 is adapted to be charged to a predetermined voltage from a pair of terminals 3 connected to a suitable source of charging potential. This source is preferably a direct current source. The condenser 2 is adapted to be discharged through the primary winding 4 of a welding transformer 5 having a secondary winding 6 connected to the load 1. The discharge of the condenser 2 is effected by means of a controlled ignition tube 7 having an anode 8, a mercury pool 9, and an ignition electrode 10 adapted to establish an arc spot on the cathode 9 when it is supplied with an igniting impulse. The anode 8 is connected to the normally positive terminal of the condenser 2 by means of a conductor 11. The cathode 9 is connected to one end of the primary winding 4, the other end of which is connected to the normally negative terminal of the condenser 2.

When the tube 7 is ignited and the condenser 2 discharges through the primary winding 4, the inductance of the discharge circuit tends to cause the current flow to persist after the voltage of the condenser has fallen to zero. This tendency manifests itself as a reversal in the voltage across the primary winding 4. In order to prevent such a reversed voltage from reaching substantial values and also to prevent the current through the load 1 from subsequently reversing, a shunt tube 12 is connected across the primary winding 4. This tube is of the same type as described in connection with tube 7. The tube 12 has an anode 13, a mercury pool cathode 14, and an ignition electrode 15. The ignition electrode may be connected to the anode 13 through a rectifying tube 16 of proper polarity so that when the anode 13 becomes positive a pulse of igniting current flows through tube 16 in order to ignite the tube 12. The cathode 14 is connected to the upper end of the primary winding 4 by a conductor 17. The anode 13 is connected to the lower end of the primary winding 4 by a conductor 18.

In order to produce a signal whenever the tubes 7 and 12 are ignited, the leads 11 and 18 leading to the anodes 8 and 13, respectively, are each surrounded by a magnetic coupling member 19. This magnetic coupling member consists of a loop of magnetic material surrounding the conductor which tends to set up a flux through said loop when a current pulse flows through said conductor. One leg of each loop 19 is surrounded by a winding 20 in which a voltage is generated whenever the flux through the magnetic loop is varied. Each winding 20 is connected to an indicating device 21, which preferably is a glow discharge lamp and which thus produces a visual signal whenever a voltage is generated in its associated winding 20. In order to limit the current flow through each lamp 21, a resistance 22 is preferably connected in series therewith.

The signal-producing structure may take the form as illustrated more completely in Fig. 2. The magnetic coupling loop consists of two L-shaped arms, each built up of a suitable number of L-shaped magnetic laminae. The two arms 23 overlap at one end thereof and a spacer 24 of non-magnetic, preferably insulating, material is inserted between the overlapping ends. The structure may be clamped together by means of a bolt 25 extending through the overlapping ends and the spacer 24. One leg of one of the L-shaped arms is surrounded by the winding 26. The structure shown in Fig. 2 may be placed directly on top of its associated ignition tube, as shown for example in Fig. 3. In order to place the above structure around one of the conductors, for example the conductor 11, the arms 23 are pivoted around the bolt 25 to provide an opening between the ends of said arms. The conductor 11 is passed through said opening and the arms 23 are then rotated so that their open ends are brought into overlapping contact and clamped in this position by bolt 25. The presence of the spacer 24 in the above construction provides a definite and substantial air gap in the magnetic loop which avoids saturation effects and results in the production of a definite voltage impulse in the coil 20 for each current impulse passing through the conductor 11.

The igniter 10 is adapted to be supplied with periodic igniting impulses thus causing periodic pulses of welding current to flow in the load 1, each of said pulses having a suitable wave as described above. During each successful welding impulse, the tubes 7 and 12 are successively ignited causing the glow lamps 21 associated with said tubes 7 and 12 to glow. This gives to the operator a visual indication of a successful weld. If neither of said lamps 21 or if only one glows upon an impulse being supplied to the electrode 10, the operator is informed that the weld which was to be produced by the accompanying impulse is defective. This permits the operator to stop the operation until said weld has been corrected or to take such other steps as may be desired. In some instances when tube 7 is ignited, tube 12 accidentally may be ignited in the inverse direction which would cause a rather large current to flow through the tubes 7 and 12 in series but which would, nevertheless, not result in the supply of a suitable welding impulse to the load 1. Under these conditions the voltage generated in each of the windings 20 is much larger than normal, thus causing the lamps 21 to glow with an appreciably greater intensity. Here likewise the operator is informed of the defective condition and may take such steps as are necessary to correct it.

Of course it is to be understood that this invention is not limited to the particular details as described above. For example, if the voltage generated in each coil 20 is not of the proper value to energize its associated lamp 21, a transformer of proper ratio may be interposed between the coil 20 and its lamp. Indicating devices other than glow lamps may be substituted for the glow lamps 21. In some instances it may be desired to have the voltages generated in coils 20 perform automatic operations such as may be desired in view of the conditions which such voltages may indicate. Various other equivalents will suggest themselves to those skilled in the art who may be desirous of utilizing the teachings of this invention. It is accordingly desired that the appended claims be given a broad interpretation commensurate with the scope of the invention within the art.

What is claimed is:

1. In an electric welding system, a resistance welding load device, comprising an inductance, a circuit for supplying welding current impulses to said load device, a controlled ignition discharge tube in said circuit, means for igniting said tube to supply said impulses to said load device, a circuit in shunt with said inductance and including a rectified discharge tube polarized to conduct current upon reversal of the voltage across said inductance upon each of said impulses passing its peak value, means responsive to the passage of a current impulse through said controlled ignition tube and separate therefrom for producing a signal, and means responsive to the passage of a current impulse through said rectifier tube and separate therefrom for producing a signal.

2. In an electric welding system, a resistance welding load device, comprising an inductance, a circuit for supplying welding current impulses to said load device, a controlled ignition discharge tube in said circuit, means for igniting said tube to supply said impulses to said load device, a circuit in shunt with said inductance and including a rectifier discharge tube polarized to conduct current upon reversal of the voltage across said inductance upon each of said impulses passing its peak value, means responsive to the passage of a current impulse through said controlled ignition tube and separate therefrom for producing a visual signal, and means responsive to the passage of a current impulse through said rectifier tube and separate therefrom for producing a visual signal, each of said signals having an intensity varying in accordance with and substantially less than the intensity of said impulse above a predetermined minimum value.

3. In an electric welding system, a resistance welding load device, comprising an inductance, a circuit for supplying welding current impulses to said load device, a controlled ignition discharge tube in said circuit, means for igniting said tube to supply said impulses to said load device, a circuit in shunt with said inductance and including a rectifier discharge tube polarized to conduct current upon reversal of the voltage across said inductance upon each of said impulses passing its peak value, each of said tubes comprising a cathode and an anode, the connections to each of said tubes including conducting leads connected to the cathode and anode of said tube, a magnetic loop surrounding one of said leads of one of said tubes, another magnetic loop surrounding one of said leads of the other of said tubes, each of said loops having a winding surrounding a leg of said loop, and means responsive to the voltage generated in said winding upon the passage of such an impulse through said last-named lead for producing a signal.

4. In an electric welding system, a resistance welding load device, comprising an inductance, a circuit for supplying welding current impulses to said load device, a controlled ignition discharge tube in said circuit, means for igniting said tube to supply said impulses to said load device, a circuit in shunt with said inductance and including a rectifier discharge tube polarized to conduct current upon reversal of the voltage across said inductance upon each of said impulses passing its peak value, each of said tubes comprising a cathode and an anode, the connections to each of said tubes including conducting leads connected to the cathode and anode of said tube, a magnetic loop surrounding one of said leads of one of said tubes, another magnetic loop surrounding one of said leads of the other of said tubes, each of said loops having a winding surrounding a leg of said loop, and a glow discharge 5. In an electric welding system, a resistance welding load device, comprising an inductance, a circuit for supplying welding current impulses to said load device, a controlled ignition discharge tube in said circuit, means for igniting said tube to supply said impulses to said load device, a circuit in shunt with said inductance and including a rectifier discharge tube polarized to conduct current upon reversal of the voltage across said inductance upon each of said impulses passing its peak value, each of said tubes comprising a cathode and an anode, the connections to each of said tubes including conducting leads connected to the cathode and anode of said tube, each of said tubes having a winding inductively coupled to one of said leads, and means responsive to the voltage generated in said winding upon the passage of such an impulse through said last-named lead for producing a signal.

6. In an electric welding system, a resistance welding load device, comprising an inductance, a circuit for supplying welding current impulses to said load device, a controlled ignition discharge tube in said circuit, means for igniting said tube to supply said impulses to said load device, a circuit in shunt with said inductance and including a rectifier discharge tube polarized to conduct current upon reversal of the voltage across said inductance upon each of said impulses passing its peak value, each of said tubes comprising a cathode and an anode, the connections to each of said tubes including conducting leads connected to the cathode and anode of said tube, each of said tubes having a winding inductively coupled to one of said leads, and means responsive to the voltage generated in said winding upon the passage of such an impulse through said last-named lead for producing a visual signal.

HANS KLEMPERER.

REFERENCES CITED

The following references are of record in the file of this patent:

UNITED STATES PATENTS

| Number | Name | Date |
|---|---|---|
| 555,130 | Thomson | Feb. 25, 1896 |
| 2,024,019 | Wright | Dec. 10, 1935 |
| 2,149,558 | Stansbury et al. | Mar. 7, 1939 |
| 2,295,293 | Rogers | Sept. 8, 1942 |
| 2,320,916 | Dawson | June 1, 1943 |